Patented Apr. 28, 1953

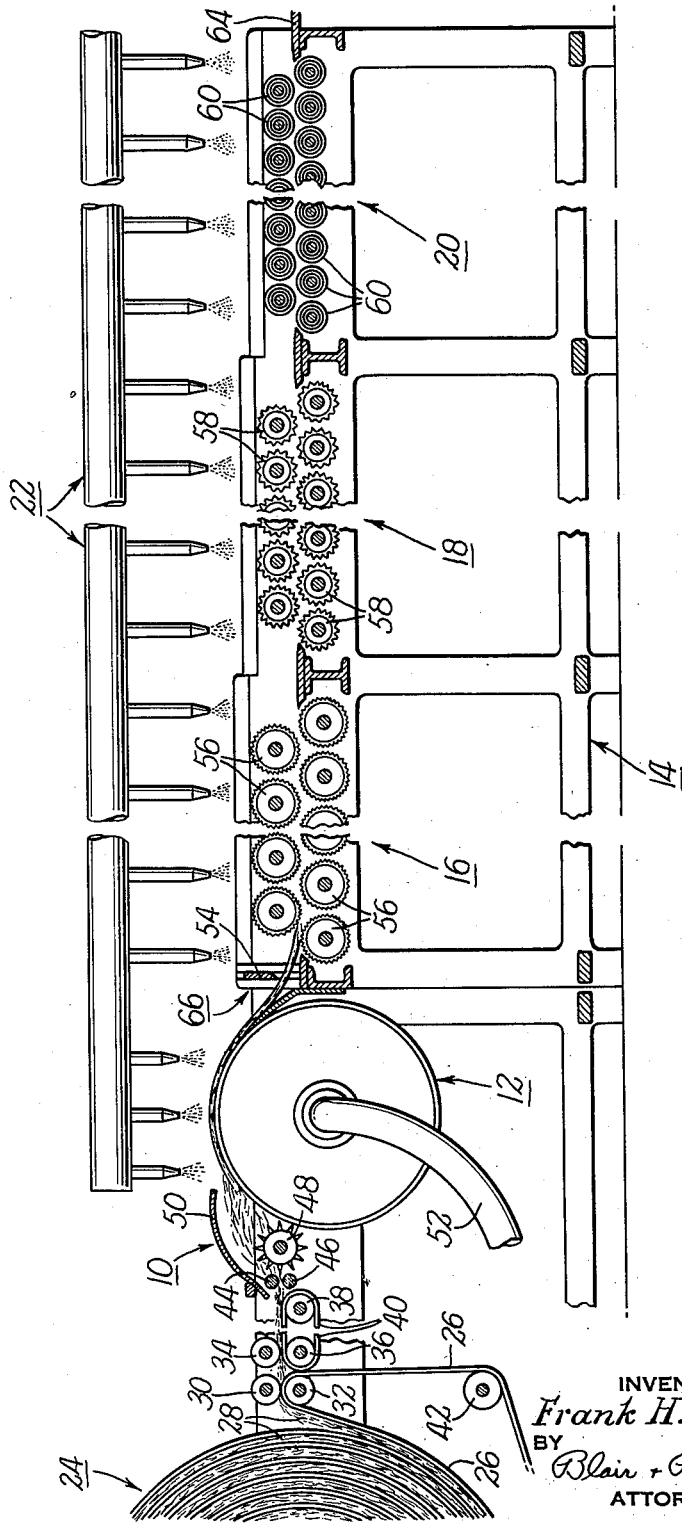

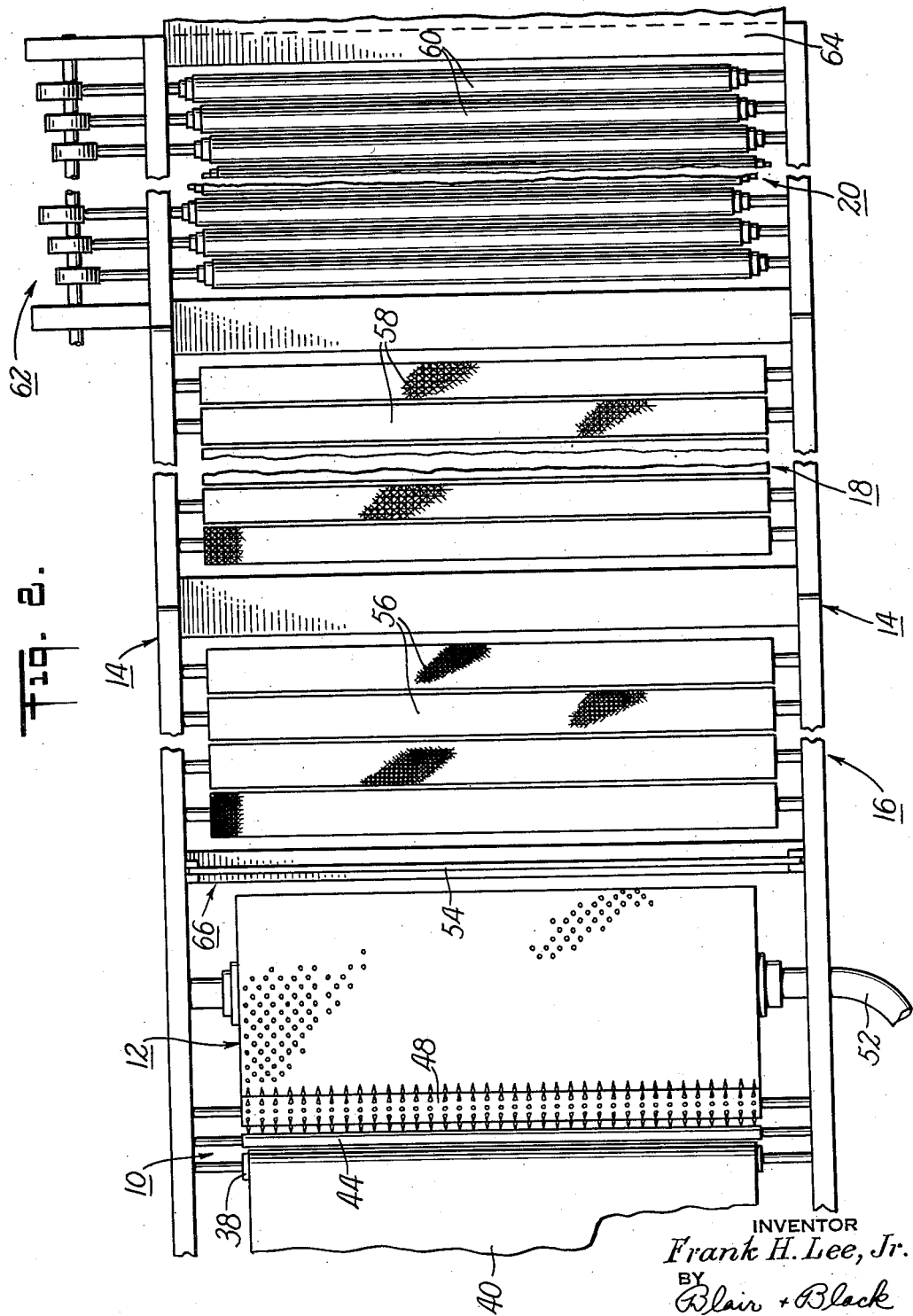

2,636,248

UNITED STATES PATENT OFFICE 2,636,248

APPARATUS FOR MAKING FELT

Frank H. Lee, Jr., Ridgefield, Conn.

Application February 1, 1950, Serial No. 141,615

5 Claims. (Cl. 28—5)

This invention relates to an apparatus for felting fur, and more particularly to a machine wherein fur may be continuously fed through feeding mechanism and processing mechanism to continuously produce strip felt.

One of the objects of this inventtion is to provide an apparatus suitable for receiving a continuous flow of feltable fur fibers, initially processing such fibers for felting, and continuously flowing such fibers between processing apparatus for producing a strip of felt. Another object of this invention is to provide a machine wherein the fur fibers are initially prepared for felting and subjected to various stages designed to work the fibers in proportion to the ability of the fibers to withstand such work. A further object is to provide a machine which may receive fur wound in ribbon form as in a paper roll, and feed such ribbon of fur to the entry end of the machine for felt processing. A further object of this invention is to provide mechanism for relating the feeding action of the machine to the processing action with resulting synchronization, to produce a superior product. Another object is to provide a process for manufacturing strip felt continuously without feeding interruption or changes during the felting operations. Other objects will be in part obvious and in part pointed out hereinafter.

The invention accordingly consists in the features of construction, combinations of elements, arrangements of parts and in the several steps and relation and order of each of the same to one or more of the others, all as will be illustratively described herein, and the scope of the application of which will be indicated in the following claims.

In the accompanying drawings, in which is shown one of the various possible embodiments of this invention, Figure 1 is a diagrammatic elevational view showing the general arrangement and relationship of apparatus used for my felting operation; and, Figure 2 is a fragmentary top plan view of the apparatus shown in Figure 1.

Similar reference characters refer to similar parts throughout the several views of the drawings.

In the present manufacture of strip felt, the strips of felt, after being formed, must be transferred from machine to machine, wherein different felting operations are performed which result in the final flat felt body. The utilization of a number of machines in a felting operation necessarily involves a great deal of manual labor, many skilled operators for the different machines, and the loss of considerable time in transferring the felt strip from machine to machine. It is a further object of the present invention to provide a single machine in which all of these feeding and felting operations may be accomplished so that the fur may be fed into one end of the machine and the finished product taken from the other end of the machine.

Generally speaking, the machine comprises feeding mechanism, generally indicated at 10, as shown in Figure 1, to direct the fur fibers to a rotating forming drum, generally indicated at 12. The felting apparatus comprises a bed, generally indicated at 14, supporting banks of rollers generally indicated at 16, 18 and 20. A spraying apparatus, generally indicated at 22, is employed to spray desired quantities of hot water on the forming drum 12 and the banks of felting rolls 16, 18 and 20. Dye may be used in the spraying water so that coloring and felting take place simultaneously.

Thus the fur is fed upon the drum 12 in the presence of hot water, where it is formed into a fragile mat of fur fibers corresponding in character to a hat bat as it is stripped from the cone of a forming machine during hat manufacture. This mat is then fed to the right into the bank of rollers 16 which are designed to knead the fur fibers in the mat in the presence of hot water, to simulate an action somewhat similar to the starting process in hat manufacture. The mat so processed by the bank of rollers 16 then passes to the bank of rollers 18, wherein more strenuous work is performed thereon, because the felt strip has now become stronger. The action of the bank 16 might be termed somewhat similar to the hardening operation in hat manufacture. Finally, the fur strip is fed further to the right through the bank of rollers 20, where the actual felting process takes place. This bank of rollers 20 corresponds to an apparatus known in the hatting industry as a "multi-roller," wherein the rollers not only rotate but reciprocate, and the felt is subjected to considerable pressure. Upon leaving the banks of rollers 20, the fur strip is in finished condition.

Although the stream of fur may be fed into the left-hand end of my machine, as viewed in Figure 1, in any convenient manner, I prefer to use the following procedure: The fur is, of course, first carroted and processed by the usual blowing operations well-known in the art, and after blowing is rolled in a ribbon or layer in a paper roll, in a manner more fully described in Kane Patent No. 2,357,474. Thus, upon completion there is produced a large roll of fur generally indicated at 24 as shown at the left in Figure 1. This roll comprises a continuous paper strip 26 wound into a roll and having between its layers a continuous ribbon of fur 28. The roll 24 may thus be transported from the blowing machine to my felting machine, and supported in any convenient manner (not shown) on a horizontal axis, to rotate in a manner to be described more fully hereinafter.

A pair of power driven feeder rolls 30 and 32, horizontally mounted one above the other for rotation in bed 14, are disposed adjacent a similar roll 34, similarly mounted. Below roll 34 is a roll 36 which may be power driven by any suitable means, in conjunction with a similar roll 38. Rolls 36 and 38 carry a feeding belt 40. A roll 42, preferably spring tensioned in a downward direction, is mounted in any suitable manner on the machine, and the paper strip 26 of the roll 24 is fed over roll 32 and under roll 42. The strip 26 then goes to winding mechanism acting in conjunction with the shaft support for the roll 24, this apparatus acting to continuously rotate the roll to feed the ribbon of fur between feed rolls 30 and 32, and thence to the right between roll 34 and belt 40.

Immediately in front, or to the right of roll 38 and supporting belt 40, is a pair of power driven rolls 44 and 46, designed to feed the fur from the belt to a picker 48, which is also driven in any suitable manner. Picker 48 is of the usual construction, designed to rotate rapidly and pick up the fur fibers in the ribbon of fur as it is fed through the feed rolls 44 and 46. A shield 50 is disposed above the picker and is shaped to direct the fur in an even stream over the entire adjacent surface of the forming drum, generally indicated at 12.

The forming drum 12 is a large perforated drum mounted in the bed 14 on a horizontal axis, as shown, and adjacent the picker. It may be rotated at desired speed and its ends are closed, except for a connection to a suction line 52. Thus, forming drum 12, as it rotates, is under heavy suction, provided by suitable fanning mechanism (not shown). As previously noted, the stream of fur is subjected to a spray of hot water as the drum 12 rotates, and the combined action of this hot water and the heavy suction are sufficient to cause the fibers to loosely interlock into a continuous mat before they leave the forming drum. In order to be certain that the loose mat of fur leaves the forming roll 12 before entering the bank of rolls 16, I provide a stripping knife 54 disposed at such an angle and so shaped that as the mat of fur approaches the entrance to that portion of the machine containing the bank 16, all sections thereof will be loosened from the former roll to pass therefrom.

The bank 16 comprises rolls 56, which may be seen more clearly in Figure 2. These rolls 56 are provided with an irregular composition surface, such as rubber, preferably comprising a pyramidal mat, or the like. The upper row of rolls 56 are spring pressed downwardly, and such pressure may be adjusted to suit the characteristics of the mat of fibers being fed therebetween. Thus, as can be seen in Figures 1 and 2, the mat passes continuously to the right between the rollers 56, and is subjected to a gentle kneading action in the presence of a continuous spray of hot water so that as it leaves the bank 16, the mat has become stronger and more suitable for heavier working.

Next, the mat of fur passes into the bank of rolls 18. Rolls 58 in this bank 18 are similar to rolls 56 and are similarly mounted. However, rolls 58 are preferably smaller in diameter, and have larger irregularities or pyramidal shapes in their surfaces. The top row of rolls 58 is spring-pressed downwardly at much greater pressure than is the top row of rolls 56. Consequently, as the mat of fur passes through the bank 18, it is subjected to considerably more work than in bank 16, or a much harder kneading action. As the mat of fur leaves the bank 18, it comprises a fairly strong, interlocked mass of fibers, well able to withstand the rugged operations which must take place in the multi-roller bank 20, where felting and shrinking occurs at a relatively high speed.

Referring now to Figures 1 and 2, the bank 20 comprises rolls 60 which are not only mounted for rotation horizontally and driven by suitable means, but are also reciprocated along their axes by suitable mechanism, generally indicated at 62, and well known in the art. Rolls 60 are preferably smaller in diameter than rolls 58, and preferably have a smooth rubber surface. The upper row of rolls 60 is spring-pressed downwardly against the lower rolls at considerable pressure. Consequently, as the mat of fur passes through bank 20, it is shrunk and felted and emerges at the right-hand end of the machine on the shelf 64. It should be understood that the number of rolls in banks 16, 18 and 20 may vary, the number shown in the drawings being merely illustrative. In the usual operation the number of rolls in the multi-roller bank 20 would be larger than shown to allow for more felting and shrinking as the matted fibers pass therethrough.

It may be desirable to manufacture the felt in a continuous strip, and when so done the ribbon of fur is fed continuously between the feed rolls 30 and 32, and emerges as a felt strip on the shelf 64 from which it may be dropped into a box, or feed into drying apparatus. The rate of movement of the paper strip 26 must gradually increase as the diameter of roll 24 decreases, and this may be done in any suitable manner, for example, with the mechanism described for this purpose in Patent No. 2,357,474. The rate of feed of feed belt 40 is adjusted to the speed of rotation of the picker 48 and the forming drum 12, to the end that an even distribution of felt on the drum, as it rotates, is provided. On the other hand, drum 12 must be rotated at a speed commensurate with the ability of the banks 16, 18 and 20 to perform their functions as described above. This may be accomplished by suitable control mechanism so that there is a definite interrelation between the several parts of the machine as it operates to produce the continuous felt strip.

Under some circumstances, it may be desirable to manufacture the strips in certain desired lengths, and to do so I provide a knife mechanism, generally indicated at 66, which may be operated to sever lengths of the matted fur at certain intervals and, of course, this may be done automatically or manually.

It will thus be seen that the several objects hereinabove referred to have been successfully accomplished in an efficient manner.

As many possible embodiments may be made of the mechanical features of the above invention, and as the art herein described might be varied in various parts, all without departing from

What is claimed is:

1. In felting apparatus, in combination, a perforated drum mounted for horizontal rotation, means for applying suction on said drum, means for directing a steady stream of feltable fur fibers on said drum, means for spraying hot water on the fibers on said drum as it rotates, a plurality of rollers arranged in two horizontal rows one above the other adjacent said drum so that the fibers may be fed therebetween from said drum, a pair of banks of smaller rollers adjacent said first-mentioned rollers to receive the matted fibers therefrom, and means for longitudinally reciprocating said last-mentioned rollers.

2. In felting apparatus, in combination, a perforated drum mounted for horizontal rotation, means for applying suction on said drum, means for directing a steady stream of feltable fur fibers on said drum, means for spraying hot water on the fibers on said drum as it rotates, a plurality of rollers arranged in two horizontal banks one above the other adjacent said drum so that the fibers may be fed therebetween from said drum, a pair of rows of smaller rollers adjacent said first-mentioned rollers to receive the matted fibers therefrom, and means for longitudinally reciprocating said last-mentioned rollers, said first-mentioned set of rollers having irregular pyramidal surfaces.

3. In felting apparatus, the combination of a perforated drum mounted for rotation around a horizontal axis, means for directing fur fibers onto said drum, means for applying suction to said drum, a series of banks of rollers having irregular surfaces and arranged to receive a continuous mat of fur from said drum, means for rotating said rollers, and a bank of rollers adjacent said first-mentioned rollers and mounted for rotation and longitudinal reciprocation, said last-mentioned bank being disposed to receive the mat of fibers from said first-mentioned rollers.

4. In felting apparatus, the combination of a perforated suction drum mounted for rotation around a horizontal axis, means for feeding fur fibers onto said drum, a first bank of rollers disposed in rows one above the other adjacent said drum to receive the mat of fur fibers from said drum, a second bank of rollers arranged in rows one above the other to receive the mat of fur fibers from said first-mentioned bank, and a third bank of rollers arranged to receive the mat of fur fibers from said second bank, said third bank of rollers being arranged for rotation and longitudinal reciprocation in rows one above the other.

5. In felting apparatus, the combination of a perforated suction drum mounted for rotation around a horizontal axis, means for feeding fur fibers onto said drum, a first bank of rollers disposed in rows one above the other adjacent said drum to receive the mat of fur fibers from said drum, a second bank of rollers arranged in rows one above the other to receive the mat of fur fibers from said first-mentioned bank, a third bank of rollers arranged to receive the mat of fur fibers from said second bank, said third bank of rollers being arranged for rotation and longitudinal reciprocation in rows one above the other, and spraying apparatus for spraying hot water on said drum and said banks.

FRANK H. LEE, Jr.

References Cited in the file of this patent

UNITED STATES PATENTS

| Number | Name | Date |
| --- | --- | --- |
| Re. 22,090 | Powell | May 5, 1942 |
| 810,898 | Archer | Jan. 30, 1906 |
| 1,460,519 | Wadsworth | July 3, 1923 |
| 1,679,100 | Sturgis | July 31, 1928 |
| 1,716,401 | Wheeler | June 11, 1929 |
| 2,083,383 | Kennedy | June 8, 1937 |
| 2,169,372 | Pecker | Aug. 15, 1939 |
| 2,357,474 | Kane | Sept. 5, 1944 |
| 2,441,390 | Boeddinghaus | May 11, 1948 |